(12) United States Patent
Kang et al.

(10) Patent No.: US 11,773,918 B2
(45) Date of Patent: Oct. 3, 2023

(54) DOUBLE CLUTCH ASSEMBLY

(71) Applicant: Pyong Hwa Valeo Co., Ltd., Daegu (KR)

(72) Inventors: Seok Min Kang, Daegu (KR); Hyeon Woo Noh, Daegu (KR)

(73) Assignee: PYONG HWA VALEO CO., LTD, Daegu (KR)

( * ) Notice: Subject to any disclaimer, the term of this patent is extended or adjusted under 35 U.S.C. 154(b) by 305 days.

(21) Appl. No.: 17/263,480

(22) PCT Filed: Jul. 25, 2019

(86) PCT No.: PCT/KR2019/009271
§ 371 (c)(1),
(2) Date: Jan. 26, 2021

(87) PCT Pub. No.: WO2020/022813
PCT Pub. Date: Jan. 30, 2020

(65) Prior Publication Data
US 2021/0156435 A1    May 27, 2021

(30) Foreign Application Priority Data

Jul. 27, 2018  (KR) .......................... 10-2018-0087824

(51) Int. Cl.
*F16D 13/58*  (2006.01)
*F16D 21/06*  (2006.01)
*F16D 125/12*  (2012.01)

(52) U.S. Cl.
CPC .......... *F16D 13/585* (2013.01); *F16D 21/06* (2013.01); *F16D 2021/0615* (2013.01); *F16D 2021/0692* (2013.01); *F16D 2125/12* (2013.01)

(58) Field of Classification Search
CPC ...... F16D 13/385; F16D 13/585; F16D 21/06; F16D 2021/0615; F16D 2021/0692; F16D 2125/12
See application file for complete search history.

(56) References Cited

U.S. PATENT DOCUMENTS 3,939,951 A * 2/1976 Sink ...................... F16D 13/585
                                                          192/89.23
4,555,005 A    11/1985 Dixon
(Continued)

FOREIGN PATENT DOCUMENTS

CN    106536957 A    3/2017
DE  102012210716 A1   1/2013
(Continued)

OTHER PUBLICATIONS

Extended European Search Report (EESR) dated May 9, 2022 for corresponding EP19839955.2.

*Primary Examiner* — Richard M Lorence
(74) *Attorney, Agent, or Firm* — TAROLLI, SUNDHEIM, COVELL & TUMMINO L.L.P

(57) ABSTRACT

The present invention includes a position restriction structure disposed in a space between an auxiliary cover casing and a diaphragm spring and having a body part fixed to the auxiliary cover casing, a mounting part extending in a circumferential direction from the body part and coupled to the auxiliary cover casing, a first protrusion protruding in an axial direction from the body part toward an incision groove of the diaphragm spring and inserted into the incision groove to restrict movement in the radial direction and a second protrusion protruding in the axial direction from the body part toward the incision groove of the diaphragm spring and inserted into the incision groove to restrict movement in the rotational direction. The position restriction structure is (Continued)

installed on the auxiliary cover casing and restrains the movement in the radial and rotational directions of the diaphragm spring.

14 Claims, 9 Drawing Sheets

(56) References Cited

U.S. PATENT DOCUMENTS

| | | | |
|---|---|---|---|
| 11,085,495 B2 * | 8/2021 | Kim | F16D 13/585 |
| 2017/0138411 A1 * | 5/2017 | Min | F16D 13/70 |

FOREIGN PATENT DOCUMENTS

| | | |
|---|---|---|
| GB | 2172670 A | 9/1986 |
| JP | H05240263 A | 9/1993 |
| JP | 6080334 B2 | 10/1994 |
| KR | 101495086 B1 | 2/2015 |
| KR | 20150102660 A | 9/2015 |
| KR | 20160006488 A | 1/2016 |
| KR | 101592730 B1 | 2/2016 |
| KR | 101898785 B1 | 9/2018 |

* cited by examiner

DOUBLE CLUTCH ASSEMBLY

RELATED APPLICATIONS

The present invention is a U.S. National Stage under 35 USC 371 patent application, claiming priority to Serial No. PCT/KR2019/009271, filed on 25 Jul. 2019; which claims priority of KR 10-2018-0087824, filed on 27 Jul. 2018, the entirety of both of which are incorporated herein by reference.

TECHNICAL FIELD

The present invention relates to a double clutch assembly, and more particularly, to a double clutch assembly capable of simultaneously restraining the movement in radial and rotational directions of a diaphragm spring to an auxiliary cover casing, aligning and maintaining in a correct position the concentricity of the diaphragm spring with respect to the center of a hub by expanding the contact area in a rotational direction with the diaphragm spring, and preventing the uneven wear of a disk caused by the eccentric contact between a pressure plate and a disk assembly.

BACKGROUND OF THE INVENTION

In general, a double clutch transmission having two input shafts uses a double clutch having two clutch disks in order to transmit a power from an engine. Such double clutch uses two clutches, and it operates in a dual manner as a gear method. Because a double shaft changes each time a gear is shifted one by one, a shifting speed is fast and it is helpful in actual fuel economy.

In particular, a dry double clutch does not use oil unlike a conventional wet double clutch, and it transmits an engine power to a transmission by the friction between a clutch disk and a pressure plate. Such a dry double clutch is disclosed in Korean Patent Registration No. 10-1180599.

Conventionally, a double clutch has a damper flywheel, a set-double clutch, a first diaphragm spring fixed coaxially so that an outer periphery is buried by the annular casing of the set-double clutch and the portion excluding the outer periphery is exposed outside the annular casing, a cover plate for supporting the outer periphery of the first diaphragm spring by a coaxial embossing part disposed coaxially adjacent to the inside of the first diaphragm spring and protruding outward from the outer periphery, a second diaphragm spring that is disposed coaxially adjacent to the inside of the cover plate to press the first pressure plate of the set-double clutch and an annular support member that is coaxially interposed between the outer periphery of the cover plate and the outer periphery of the second diaphragm spring so that the second diaphragm spring is supported by the cover plate.

In such conventional double clutch, however, the axis center between the clutch and the diaphragm spring is distorted when the diaphragm spring is contracted and restored, and the mismatch in concentricity causes eccentric contact between a pressure plate and a disk. As a result, there is a problem of uneven wear of the disk.

RELATED LITERATURE

Patent Publication

Korean Patent Registration No. 10-1180599

SUMMARY OF THE INVENTION

Problems to be Solved

The present invention provides a double clutch assembly which is capable of simultaneously restraining the movement in radial and rotational directions of a diaphragm spring to an auxiliary cover casing, aligning and maintaining in a correct position the concentricity of the diaphragm spring with respect to the center of a hub by expanding the contact area in a rotational direction with the diaphragm spring, and preventing the uneven wear of a disk caused by the eccentric contact between a pressure plate and a disk assembly.

Means to Solve the Problems

According to one aspect of the present invention, a double clutch assembly may include a cover casing installed to receive a driving force from an engine and to rotate, a diaphragm spring installed to be retractable in an axial direction with respect to the cover casing, a center plate coupled to the cover casing and installed to be idle with respect to an input shaft of a transmission, an auxiliary cover casing coupled to the center plate and to form a supporting point of the diaphragm spring together with the cover casing, a pressure plate coupled to the cover casing and installed to be idle with respect to the input shaft of the transmission, an auxiliary pressure plate coupled to the center plate and installed to be idle with respect to the input shaft of the transmission, an auxiliary diaphragm spring installed between the auxiliary cover casing and the auxiliary pressure plate, a disk assembly installed between the center plate and the pressure plate and to include a hub coupled to the input shaft of the transmission to provide the driving force transmitted through the pressure plate to the input shaft of the transmission, an auxiliary disk assembly installed between the center plate and the auxiliary pressure plate and to include a hub coupled to the input shaft of the transmission to provide the driving force transmitted through the auxiliary pressure plate to the input shaft of the transmission, and a position restriction structure fixed to the auxiliary cover casing and to restrict a movement in a radial direction and a rotation direction of the diaphragm spring. The position restriction structure may be disposed in a space between the auxiliary cover casing and the diaphragm spring, and the position restriction structure may include a body part fixed to the auxiliary cover casing, a mounting part extending in a circumferential direction from the body part and coupled to the auxiliary cover casing, a first protrusion protruding in the axial direction from the body part toward an incision groove of the diaphragm spring and inserted into the incision groove to restrict movement in the radial direction and a second protrusion protruding in the axial direction from the body part toward the incision groove of the diaphragm spring and inserted into the incision groove to restrict movement in the rotational direction.

In the present invention, the mounting part may be formed at both ends of the body part, and include a through hole for coupling with the auxiliary cover casing.

In the present invention, the first protrusion may be bent so as to protrude in the axial direction from a central portion of the body part, and a free end of the first protrusion may extend horizontally to make surface contact with an outermost inner peripheral surface in the radial direction of the incision groove of the diaphragm spring.

In the present invention, the second protrusion may be located inside from the first protrusion in the radial direction.

In the present invention, the second protrusion may include a first bent part bent so as to protrude in the axial direction from the central portion of the body part and a second bent part bent so as to protrude outward from both ends of the first bent part in the radial direction and making surface contact with each of both inner peripheral surfaces of the incision groove of the diaphragm spring in the circumferential direction.

In the present invention, the position restriction structure may be installed in a radial arrangement with respect to the center of the auxiliary cover casing, and the auxiliary cover casing may include a first through hole for coupling with the mounting part.

In the present invention, the double clutch assembly may further include an auxiliary position restriction structure fixed to the auxiliary pressure plate and to restrict the movement in the radial direction and the rotation direction of the auxiliary diaphragm spring. The auxiliary position restriction structure may include one end inserted and supported in an assembly hole of the auxiliary pressure plate and the other end configured to make surface contact with an outermost inner peripheral surface in the radial direction and both inner peripheral surfaces in the circumferential direction of the incision groove of the auxiliary diaphragm spring.

In the present invention, the auxiliary position restriction structure may be installed in a radial arrangement with respect to the center of the auxiliary pressure plate, and the auxiliary cover casing may include a second through hole through which the auxiliary position restriction structure is inserted.

Effects of the Invention

The double clutch assembly according to the embodiment of the present invention can be installed in an auxiliary cover casing and simultaneously restrain the movement in radial and rotational directions of a diaphragm spring. Thus, it is possible to align and maintain the concentricity of the diaphragm spring in a correct position with respect to the center of a hub, when the diaphragm spring is compressed and restored by the operation of the clutch.

In addition, the present invention can maintain the concentricity of the diaphragm spring with respect to the hub center of the clutch in a correct position, and prevent the eccentric contact between a pressure plate and a disk assembly. Thus, a uniform load between the pressure plate and the disk assembly can be induced when the clutch is fastened and the geometric judder can be improved.

Further, the present invention can expand the area of the contacts between an incision groove of a diaphragm spring and a position restriction structure in a radial direction and a rotational direction by way of surface contact, so that the problem of the uneven wear can be solved by the expansion of the contact area in the rotational direction when the eccentricity due do an external force is occurred, thereby actively preventing the shortening of the product's lifespan.

DETAILED DESCRIPTION OF THE EMBODIMENTS

Figure 1:
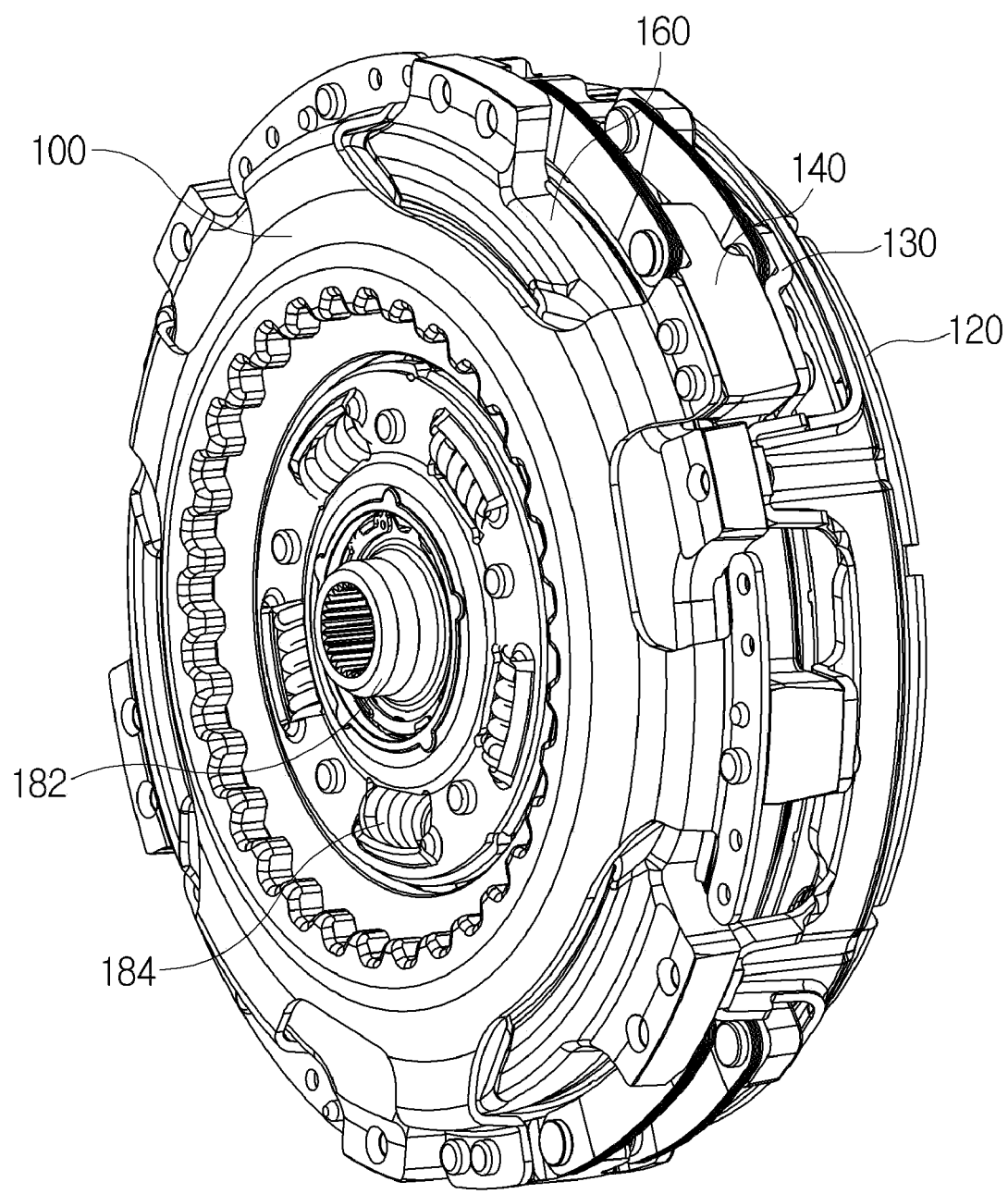
FIG. 1 is a perspective view of a double clutch assembly according to the present invention.
Figure 2:
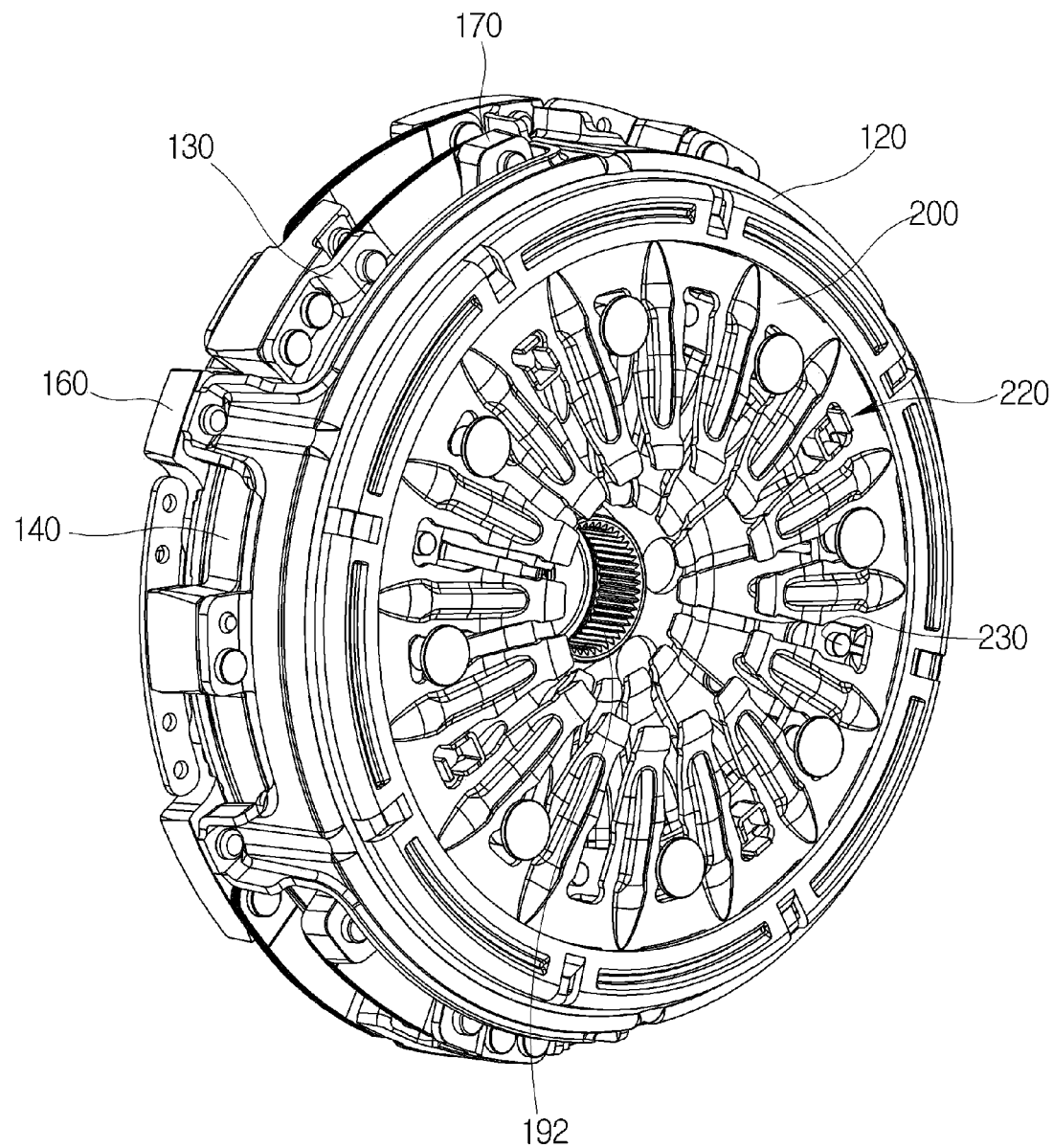
FIG. 2 is a perspective view of a rear portion of the double clutch assembly shown in FIG. 1.

Hereinafter, the embodiments of the present invention will be described in detail with reference to the accompanying drawings.

Referring to FIGS. 1 to 4, the double clutch assembly according to the present invention may include a connection casing 100, a cover casing 120, an auxiliary cover casing 130, a center plate 140, a pressure plate 160, and an auxiliary pressure plate 170, a disk assembly 180, an auxiliary disk assembly 190, a diaphragm spring 200, an auxiliary diaphragm spring 210, a position restriction structure 220 and an auxiliary position restriction structure 230.

The connection casing 100 may be configured to be directly connected to the output side of an engine and to receive the driving force generated from the engine. Thus, the connection casing 100 may be formed of a ring-shaped disk member and include a serration part 102, as a joint portion for power transmission with the engine, uniformly formed concentrically over the entire circumference of inner peripheral surface of the central portion. In addition, the connection casing 100 may include a flange part 104 formed at the edge portion for coupling with the center plate 140.

The cover casing 120 may be configured to couple to the connection casing 100 and to rotate about the central axis of the clutch when the engine is operated. Thus, the cover casing 120 may be formed of a ring-shaped disc member and include an installation hole 122 in the form of perforation in the central portion that is disposed outside and is coaxial with the input shaft of a transmission. In addition, the cover casing 120 may include a flange part 124 at an edge portion for coupling with the pressure plate 160.

The auxiliary cover casing 130 may be configured to couple to the center plate 140 and to rotate about the central axis of the clutch when the engine is operated. Thus, the auxiliary cover casing 130 may be formed of a ring-shaped disc member and include an installation hole 132 in the form of perforation in the central portion that is disposed outside and is coaxial with the input shaft of the transmission. In addition, the auxiliary cover casing 130 may form a flange part 134 at an edge portion for coupling with the center plate 140. In addition, the auxiliary cover casing 130 may include a rear protrusion 136 that protrudes toward the auxiliary diaphragm spring 210 for setting a support point for the auxiliary diaphragm spring 210.

In addition, the auxiliary cover casing 130 may include a plurality of first through holes 138 at the inner edge portion in radial direction of the split-type protrusion 137 for fixing and installing the position restriction structure 220 by riveting. In addition, the auxiliary cover casing 130 may include a plurality of second through holes 139 at the edge portion for supporting the free end of the auxiliary position restriction structure 230. In one embodiment, the first through hole 138 and the second through hole 139 may be configured to be disposed in a radial arrangement with respect to the center of the cover casing 120 and to be alternately positioned.

The center plate 140 may be configured to couple to the cover casing 120 and to be capable of idling with respect to the input shaft of the transmission located at the center of the clutch when the engine is operated. Thus, the center plate 140 may be formed of a ring-shaped disc member and include an installation hole 142 in the form of perforation in the central portion that is disposed outside and is coaxial with the input shaft of the transmission. In addition, the center plate 140 may include a flange part 144 at the edge portion corresponding to the flange part 104 of the connection casing 100 for coupling with the connection casing 100. In addition, the center plate 140 may include a bearing 146 on the inner peripheral surface of the installation hole 142 for idling support of the input shaft of the transmission.

The pressure plate 160 may be configured to couple to the cover casing 120 and to rotate about the central axis of the clutch when the engine is operated. Thus, the pressure plate 160 may be formed of a ring-shaped disc member and include an installation hole 162 in the form of perforation in a central portion that is disposed outside and is coaxial with the input shaft of the transmission. In addition, the pressure plate 160 may include a flange part 164 at the edge portion corresponding to the flange part 124 of the cover casing 120 for coupling with the cover casing 120.

The auxiliary pressure plate 170 may be configured to couple to the center plate 140 and to be idle with respect to the input shaft of the transmission located at the center of the clutch when the engine is operated. Thus, the auxiliary pressure plate 170 may be formed of a ring-shaped disc member and include an installation hole 172 in the form of perforation in the central portion that is disposed outside and is coaxial with the input shaft of the transmission. In addition, the auxiliary pressure plate 170 may include a flange part 174 at the edge portion for coupling with the center plate 140.

In addition, the auxiliary pressure plate 170 may include a plurality of assembly holes 176 at the edge portion for fixing and installing the auxiliary position restriction structure 230. In one embodiment, the assembly hole 176 may be configured to be positioned in a radial arrangement structure with respect to the center of the auxiliary pressure plate 170 in which one end of the auxiliary position restriction structure 230 is inserted and supported.

The disk assembly 180 may be installed between the center plate 140 and the pressure plate 160 and include a hub 182 on the center portion for coupling with one of the input shafts of the transmission, for example, a solid input shaft. In addition, the disk assembly 180 may include a damper spring 184 for buffering a sudden change in a driving force at the circumference of the hub 182 and a facing 186 between the center plate 140 and the pressure plate 160 and contactable therewith.

Accordingly, when the diaphragm spring 200 is contracted, the pressure plate 160 is pressed by the axial movement of the cover casing 120 and the connection casing 100, and the facing 186 is in contact with the center plate 140 due to the pressure of the pressure plate 160. Accordingly, the engine driving force is transmitted to the hub 182 of the disk assembly 180 through the facing 186 in close contact between the center plate 140 and the pressure plate 160, so that the input shaft of the transmission can be rotated.

The auxiliary disk assembly 190 may be installed between the center plate 140 and the auxiliary pressure plate 170, and include a hub 192 on the center for coupling with one of the input shafts of the transmission, for example, a hollow input shaft. In addition, the auxiliary disk assembly 190 may include a facing 194 between the center plate 140 and the auxiliary pressure plate 170 at a circumferential portion thereof and contactable therewith.

Thus, when the auxiliary diaphragm spring 210 is contracted, the auxiliary pressure plate 170 is pressed by the axial movement of the auxiliary cover casing 130, and the facing 194 is pressed by the auxiliary pressure plate 170 and comes into contact with the center plate 140. Accordingly, the engine driving force is transmitted to the hub 192 of the auxiliary disk assembly 190 via the facing 194 in close contact between the center plate 140 and the auxiliary pressure plate 170 so that the input shaft of the transmission can be rotated.

The diaphragm spring 200 may be a plate spring in the form of a washer installed between the cover casing 120 and the auxiliary cover casing 130 and be configured to have an elastic piece divided into multiple pieces so that an incision groove 202 may be radially formed from the circumferential surface of the edge portion toward the center portion. In one embodiment, the center portion of the diaphragm spring 200 may be formed in an open shape for installation of the transmission input shaft.

In addition, the diaphragm spring 200 may be contracted and deformed obliquely in the axial direction of the clutch according to the operation of an actuator to implement an axial displacement with respect to the cover casing 120, so that the transmission of the engine driving power can be occurred by the contacts among the center plate 140, the disk assembly 180 and the pressure plate 160.

Figure 4:
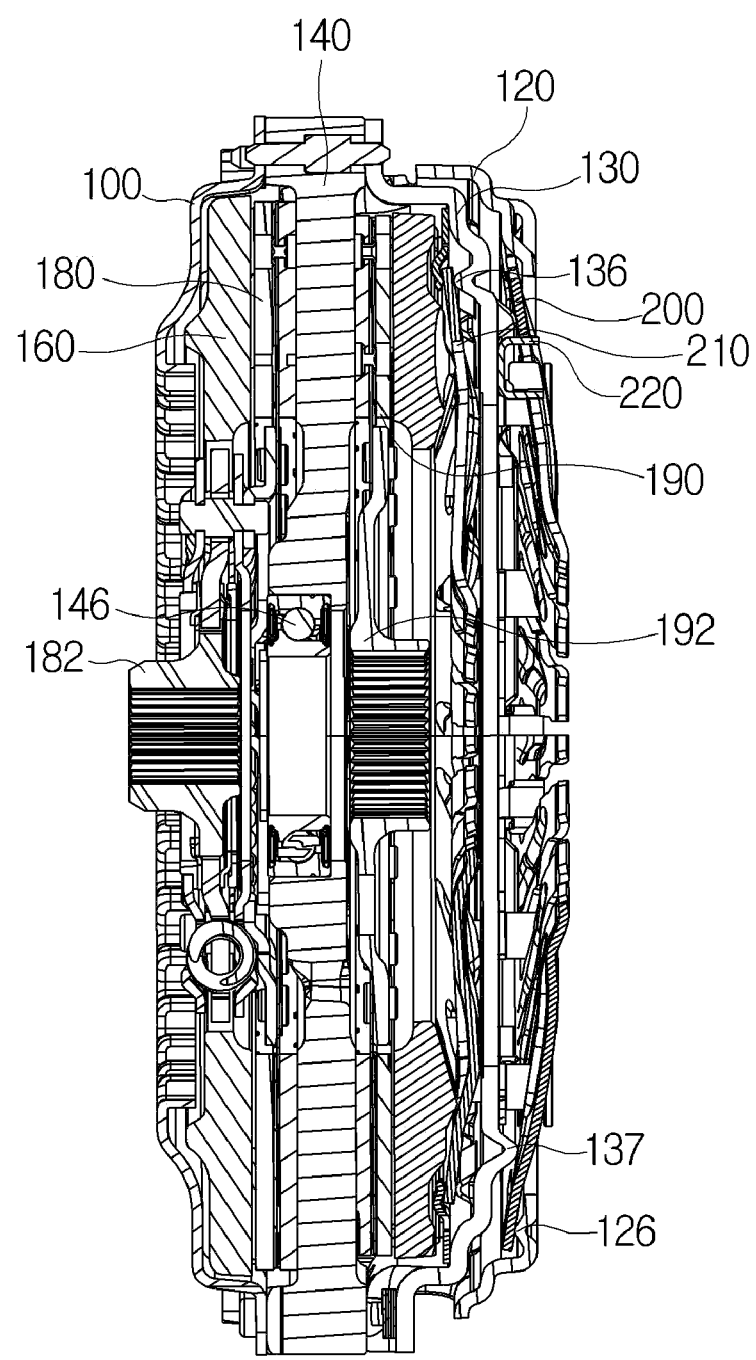
FIG. 4 is a cross-sectional view of the overall configuration of the double clutch assembly shown in FIGS. 1 and 2.

The cover casing 120 may include a protrusion 126 protruding toward the diaphragm spring 200 to form a support point of the diaphragm spring 200, as shown in FIG. 4, and the auxiliary cover casing 130 may include a divided protrusion 137 protruding toward the diaphragm spring 200 to form a support point of the diaphragm spring 200 together with the protrusion 126 of the cover casing 120. In one embodiment, the protrusion 126 may be formed at the edge portion adjacent to the circumferential surface than the divided protrusion 137 based on the radial direction of the diaphragm spring 200.

The auxiliary diaphragm spring 210 may be a plate spring in the form of a washer installed between the auxiliary cover casing 130 and the auxiliary pressure plate 170, and be configured to have an elastic piece divided into a plurality of pieces so that an incision groove 212 may be radially from the circumferential surface of the edge portion toward the center portion. In one embodiment, the center portion of the auxiliary diaphragm spring 210 may be formed in an open shape for installation of the transmission input shaft.

In addition, the auxiliary diaphragm spring 210 may be also contracted and deformed obliquely in the axial direction of the clutch according to the operation of an actuator in the same manner as the diaphragm spring 200 to implement an axial displacement with respect to the cover casing 120. Accordingly, the transmission of the driving force can be occurred by the contacts among the center plate 140, the auxiliary disk assembly 190 and the auxiliary pressure plate 170.

The auxiliary cover casing 130 may include a rear protrusion 136 protruding toward the auxiliary diaphragm spring 210 to form a support point of the auxiliary diaphragm spring 210 as shown in FIG. 4. In one embodiment, the rear protrusion 136 may form a support point for the auxiliary diaphragm spring 210 at a single location, unlike the protrusion 126 and the divided protrusion 137, and more specifically, at the location of the outer edge portion in the radial direction of the auxiliary diaphragm spring 210.

The position restriction structure 220 may be fixedly installed on the auxiliary cover casing 130 and restrict the movement in the radial and rotational directions the diaphragm spring 200 at the same time. Thus, the position restriction structure 220, as shown in FIG. 7, may include a body part 221, a mounting part 222, a first protrusion 223 and a second protrusion 224.

The body part 221 may be formed of a plate-shaped member disposed in the circumferential direction in the space between the auxiliary cover casing 130 and the diaphragm spring 200 and fixed to the auxiliary cover casing 130.

The mounting part 222 may be configured to extend long in the circumferential direction from the body part 221 and to have a through hole 222a for coupling with the auxiliary cover casing 130. In one embodiment, the mounting part 222 may be provided at each end of the body part 221.

Figure 5:
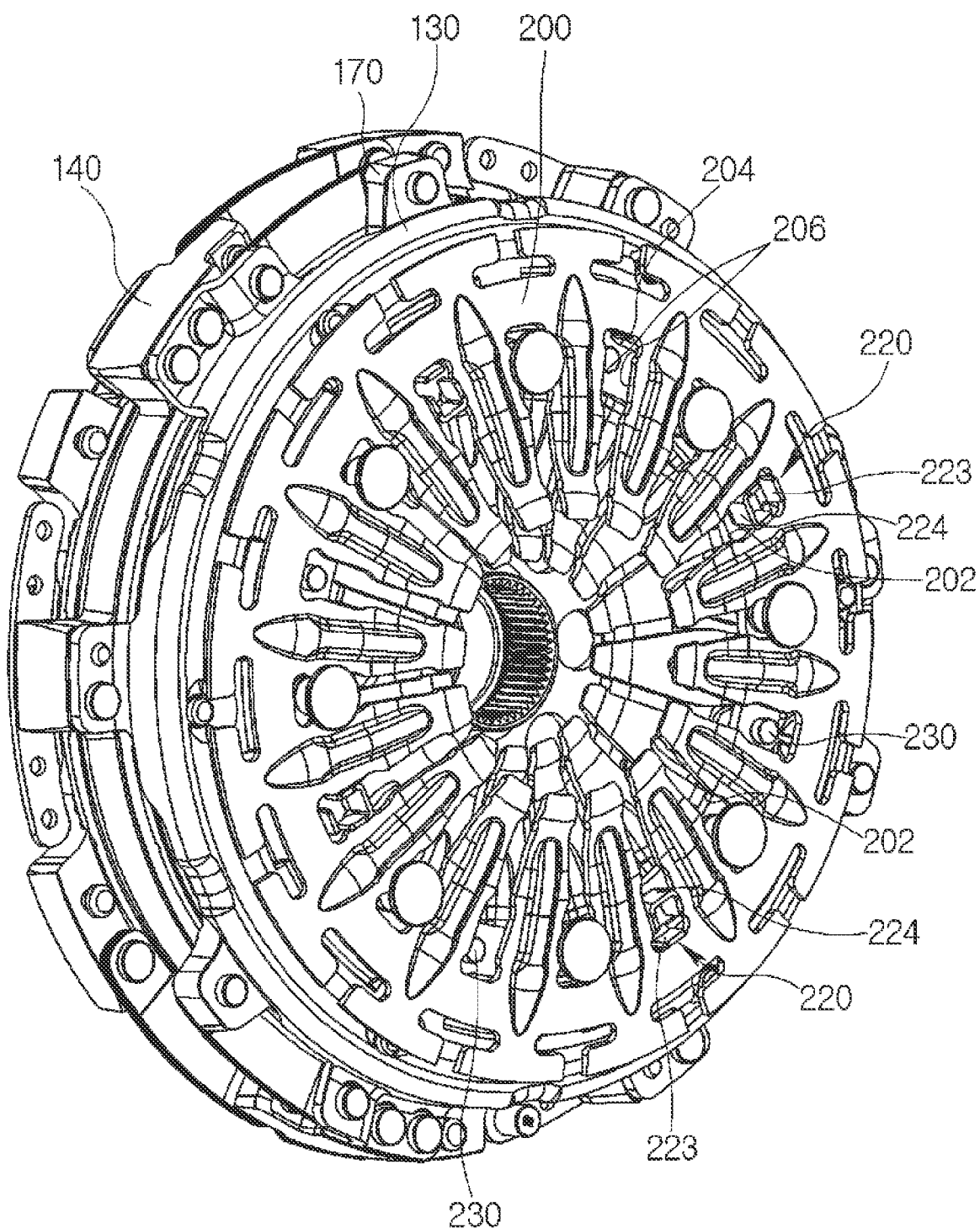
FIG. 5 is a perspective view showing a state in which a diaphragm spring is supported by a position restriction structure when the cover casing of FIG. 2 is removed.
Figure 7:
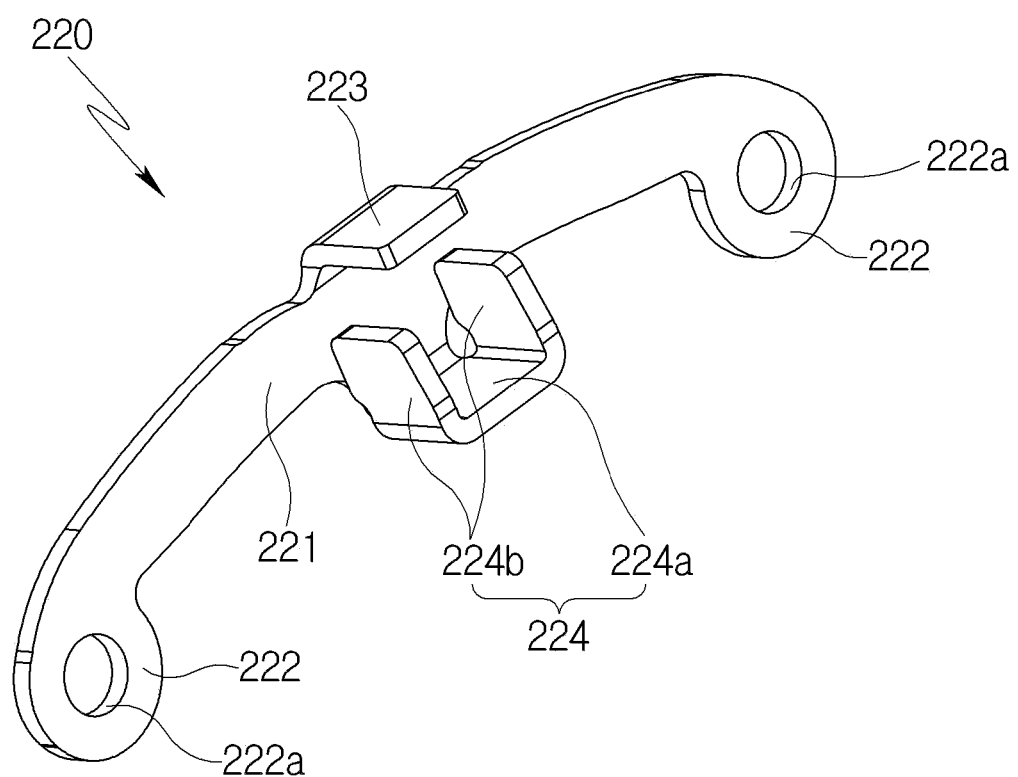
FIG. 7 is a perspective view of the position restriction structure shown in FIG. 6.

Referring to FIGS. 5 and 7, the first protrusion 223 may protrude in the axial direction from the body part 221 toward the incision groove 202 of the diaphragm spring 200 and be inserted into the incision groove 202. Accordingly, it can restrain the movement in the radial direction to the diaphragm spring 200. In particular, the first protrusion 223 may be bent so as to protrude in the axial direction from the central portion of the body part 221, and thus, a free end may extend horizontally and make surface contact with the outermost inner peripheral surface 204 in the radial direction of the incision groove 202 of the diaphragm spring 200. Thus, the first protrusion 223 may be configured to have a planar structure extending in the axial direction and the radial direction respectively, for surface contact for expanding the contact area with the outermost inner peripheral surface 204 in the radial direction of the incision groove 202 of the diaphragm spring 200.

Referring to FIGS. 5 and 7, the second protrusion 224 may be located radially inward from the first protrusion 223, and protruded from the body part 221 toward the incision groove 202 of the diaphragm spring 200 in the axial direction and inserted into the incision groove 202. Thus, it can restrict the movement in the rotational direction to the diaphragm spring 200. In particular, the second protrusion 224 may include a first bent part 224a that is bent to protrude in the axial direction from the central portion of the body part 221, and a second bent part 224b that is bent to protrude radially outward from both ends of the first bent part 224a to make surface contact with both inner peripheral surfaces 206 in the circumferential direction of the incision groove 202 of the diaphragm spring 200, respectively. Accordingly, the second bent part 224b may be configured to have a planar surface structure extending in the axial direction and the radial direction respectively, for surface contact for the expansion of the contact area with both inner peripheral surfaces 206 in circumferential direction of the incision groove 202 of the diaphragm spring 200.

Figure 6:
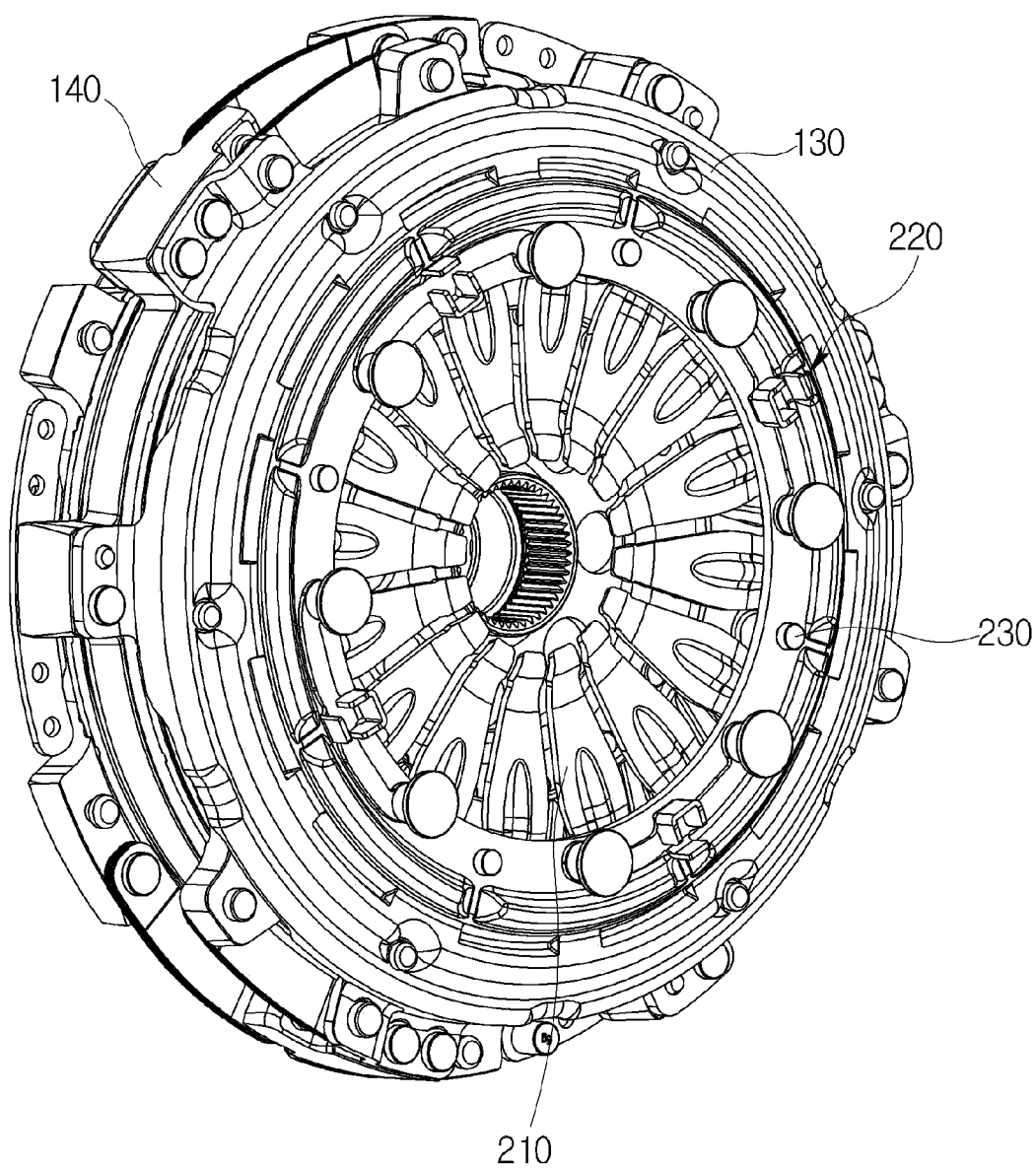
FIG. 6 is a perspective view showing a state in which the diaphragm spring of FIG. 5 is removed and a position restriction structure is assembled with respect to an auxiliary cover casing.

In addition, as shown in FIG. 6, the position restriction structure 220 may be a radial arrangement structure with respect to the center of the auxiliary cover casing 130, and it may be configured to be spaced apart from each other at appropriate intervals. In addition, in the embodiment of the present invention, the shape of the first protrusion 223 and the second protrusion 224 can be implemented in various forms of modified embodiments, and in particular, the second protrusion 224 is illustrated to be located radially inward from the first protrusion 223, but is not limited thereto.

Figure 3:
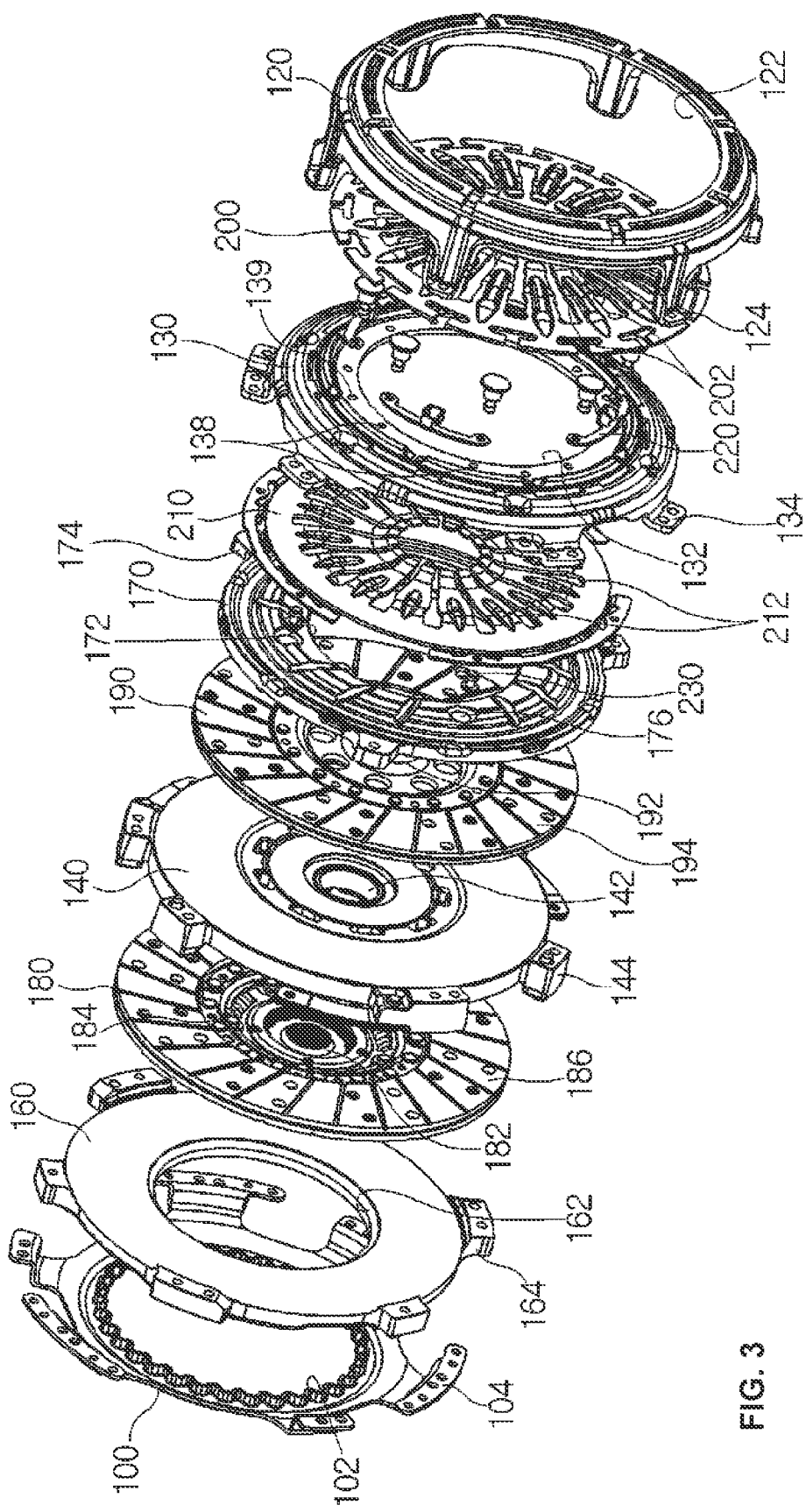
FIG. 3 is an exploded perspective view of the overall configuration of the double clutch assembly shown in FIGS. 1 and 2.
Figure 8:
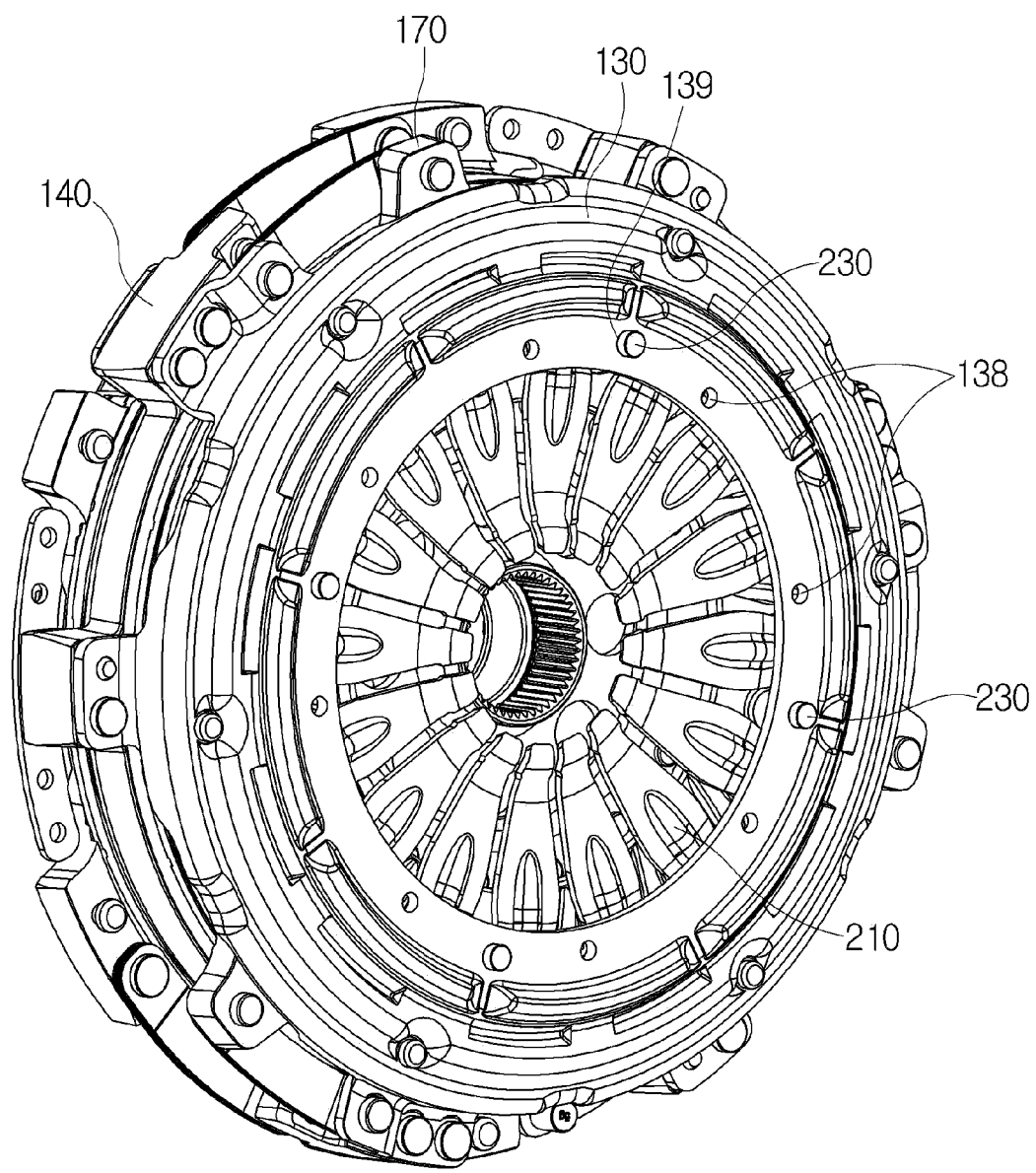
FIG. 8 is a perspective view illustrating that the position restriction structure of FIG. 6 removed.
Figure 9:
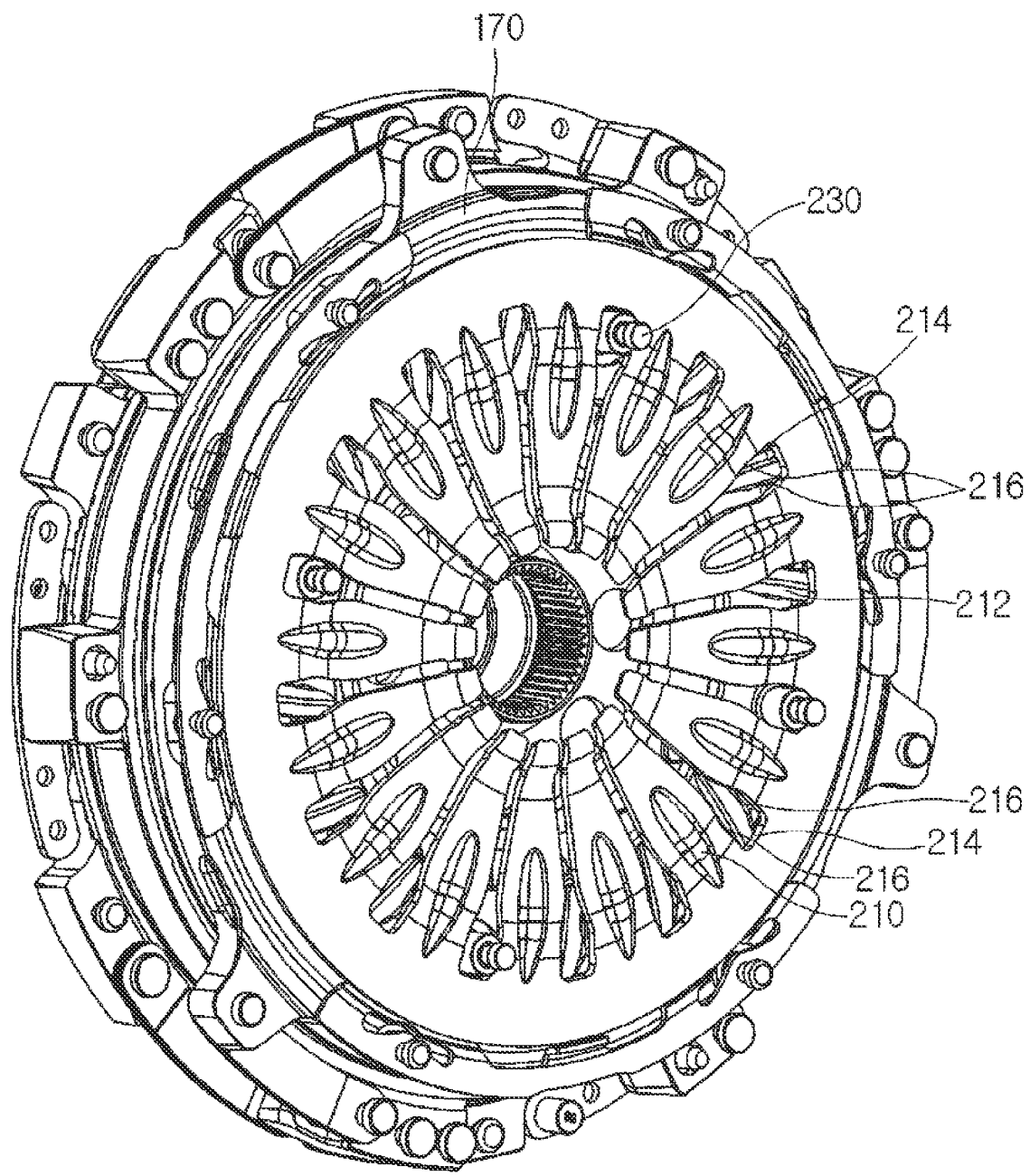
FIG. 9 is a perspective view showing a state in which an auxiliary diaphragm spring is supported by an auxiliary position restriction structure after removing the auxiliary cover casing of FIG. 8.

The auxiliary position restriction structure 230 may be fixed to the auxiliary pressure plate 170 and restrict the movement in the radial and rotation directions of the auxiliary diaphragm spring 210 at the same time. Thus, as shown in FIGS. 3, 8 and 9, the auxiliary position restriction structure 230 may be configured to have one end that is inserted and supported in the assembly hole 176 of the auxiliary pressure plate 170, and the other end that simultaneously makes surface contact with the outmost inner peripheral surface 214 in the radial direction and both inner peripheral surfaces 216 in the circumferential direction of the incision groove 212 of the auxiliary diaphragm spring 210. In particular, the free end at the other end of the auxiliary position restriction structure 230 may be inserted and installed to be exposed to an outside by passing through the incision groove 212 of the auxiliary diaphragm spring 210 and via the second through hole 139 formed in the auxiliary cover casing 130. Accordingly, a more reliable installation can be implemented. In one embodiment, the auxiliary position restriction structure 230 may be any structure having a predetermined length in various forms such as a structure having a cylindrical shape in a pin shape or a structure having a rectangular cross section.

Therefore, in the position restriction structure 220, the mounting part 222 of the body part 221 may be riveted against the first through hole 138 of the auxiliary cover casing 130 to be firmly fixed, and the first protrusion 223 can effectively restrain the movement in the radial direction of the diaphragm spring 200 by making surface contact with the outermost inner peripheral surface 204 in the radial direction of the incision groove 202 of the diaphragm spring 200. The second protrusion 224 can effectively restrain the movement in the rotational direction of the diaphragm spring 200 by making surface contact with each of both inner peripheral surfaces 206 in the circumferential direction of the incision groove 202 of the diaphragm spring 200.

In one embodiment, the first protrusion 223 of the position restriction structure 220 can make surface contact with the outermost inner peripheral surface 204 in the radial direction of the incision groove 202 of the diaphragm spring 200, and the second protrusion 224 can make surface contact with each of both inner peripheral surfaces 206 in the circumferential direction of the incision groove 202 of the diaphragm spring 200. Thus, the movement in both the radial and rotational directions of the diaphragm spring 200 to the auxiliary cover casing 130 can be effectively restrained by expanding the area of each contact area, while the concentricity of the diaphragm spring 200 with respect to the center of each hub 182 and 192 can be aligned and maintained in the correct position. Thus, the eccentric contact occurred between the pressure plate 160 and the disk assembly 180 can be prevented, and a uniform load transfer between the pressure plate 160 and the disk assembly 180 can be induced when the clutch is fastened. Accordingly, it is possible to improve the geometric judder and thus, greatly extend the lifespan of a product.

In addition, in the auxiliary position restriction structure 230, one end can be inserted and supported in the assembly hole 176 of the auxiliary pressure plate 170, and make surface contact with the outermost inner peripheral surface 214 in the radial direction and the both inner peripheral surface 216 in the circumferential direction of the auxiliary diaphragm spring 210, respectively. Thus, the free end at the other end can be inserted and supported in the second through hole 139 of the auxiliary cover casing 130, and thus, the movement in the radial and rotational directions of the auxiliary diaphragm spring 210 can be simultaneously restrained.

Even in this case, since the auxiliary position restriction structure 230 can maintain the concentricity of the auxiliary diaphragm spring 210 in a correct position as the position restriction structure 220, it is possible to prevent the eccentric contact occurring between the auxiliary pressure plate 170 and the auxiliary disk assembly 190, and induce uniform load transfer between the auxiliary pressure plate 170 and the auxiliary disk assembly 190 when the clutch is fastened.

| Explanation of reference numerals | |
| --- | --- |
| 100 - connection casing | 120 - cover casing |
| 130 - auxiliary cover casing | 140 - center plate |
| 160 - pressure plate | 170 - auxiliary pressure plate |
| 180 - disk assembly | 190 - auxiliary disk assembly |
| 200 - diaphragm spring | 210 - auxiliary diaphragm spring |
| 220 - position restriction structure | |
| 221 - body part | 222 - mounting part |
| 223 - first protrusion | 224 - second protrusion |
| 230 - auxiliary position restriction structure | |

The invention claimed is:

1. A double clutch assembly comprising:
   a cover casing installed to receive a driving force from outside and to rotate;
   a diaphragm spring installed to be retractable in an axial direction with respect to the cover casing;
   a center plate coupled to the cover casing;
   an auxiliary cover casing coupled to the center plate and to form a supporting point of the diaphragm spring;
   a pressure plate coupled to the cover casing;
   an auxiliary pressure plate coupled to the center plate;
   an auxiliary diaphragm spring installed between the auxiliary cover casing and the auxiliary pressure plate;
   a disk assembly installed between the center plate and the pressure plate;
   an auxiliary disk assembly installed between the center plate and the auxiliary pressure plate; and
   a position restriction structure fixed to the auxiliary cover casing and to restrict a movement in a radial direction and a rotation direction of the diaphragm spring,
   wherein the position restriction structure is disposed in a space between the auxiliary cover casing and the diaphragm spring, and
   the position restriction structure includes a body part fixed to the auxiliary cover casing, a mounting part extending in a circumferential direction from the body part and coupled to the auxiliary cover casing, a first protrusion protruding in the axial direction from the body part toward an incision groove of the diaphragm spring and inserted into the incision groove to restrict movement in the radial direction and a second protrusion protruding in the axial direction from the body part toward the incision groove of the diaphragm spring and inserted into the incision groove to restrict movement in the rotational direction.

2. The double clutch assembly of claim 1, wherein the mounting part is formed at both ends of the body part, and includes a through hole for coupling with the auxiliary cover casing.

3. The double clutch assembly of claim 2, wherein the first protrusion is bent so as to protrude in the axial direction from a central portion of the body part, and a free end of the first protrusion extends horizontally to make surface contact with an outermost inner peripheral surface in the radial direction of the incision groove of the diaphragm spring.

4. The double clutch assembly of claim 2, wherein the second protrusion includes a first bent part bent so as to protrude in the axial direction from the central portion of the body part and a second bent part bent so as to protrude outward from both ends of the first bent part in the radial direction and making surface contact with each of both inner peripheral surfaces of the incision groove of the diaphragm spring in the circumferential direction.

5. The double clutch assembly of claim 1, wherein the second protrusion is located inside from the first protrusion in the radial direction.

6. The double clutch assembly of claim 1, wherein the position restriction structure is installed in a radial arrangement with respect to the center of the auxiliary cover casing, and the auxiliary cover casing includes a first through hole for coupling with the mounting part.

7. The double clutch assembly of claim 1, wherein the double clutch assembly further comprises an auxiliary position restriction structure fixed to the auxiliary pressure plate and to restrict the movement in the radial direction and the rotation direction of the auxiliary diaphragm spring, and
   the auxiliary position restriction structure includes one end inserted and supported in an assembly hole of the auxiliary pressure plate and the other end configured to make surface contact with an outermost inner peripheral surface in the radial direction and both inner peripheral surfaces in the circumferential direction of an incision groove of the auxiliary diaphragm spring.

8. The double clutch assembly of claim 7, wherein the auxiliary position restriction structure is installed in a radial arrangement with respect to the center of the auxiliary pressure plate, and the auxiliary cover casing includes a second through hole through which the auxiliary position restriction structure is inserted.

9. A double clutch assembly comprising:
   a cover casing installed to receive a driving force from outside and to rotate;
   a diaphragm spring installed to be retractable in an axial direction with respect to the cover casing;
   a center plate coupled to the cover casing;
   an auxiliary cover casing coupled to the center plate and to form a supporting point of the diaphragm spring;
   a pressure plate coupled to the cover casing;
   an auxiliary pressure plate coupled to the center plate;
   an auxiliary diaphragm spring installed between the auxiliary cover casing and the auxiliary pressure plate;
   a disk assembly installed between the center plate and the pressure plate;
   an auxiliary disk assembly installed between the center plate and the auxiliary pressure plate; and
   a position restriction structure fixed to the auxiliary cover casing and to restrict a movement in a radial direction and a rotation direction of the diaphragm spring, wherein the position restriction structure is disposed in a space between the auxiliary cover casing and the diaphragm spring, and the position restriction structure includes a body part fixed to the auxiliary cover casing, a mounting part extending in a circumferential direction from the body part and coupled to the auxiliary cover casing, a first protrusion protruding in the axial direction from the body part toward an incision groove of the diaphragm spring and inserted into the incision groove to restrict movement in the radial direction and a second protrusion protruding in the axial direction from the body part toward the incision groove of the diaphragm spring and inserted into the incision groove to restrict movement in the rotational direction, wherein the second protrusion is located inside from the first protrusion in the radial direction, and wherein the second protrusion includes a first bent part bent so as to protrude in the axial direction from the central portion of the body part and a second bent part bent so as to protrude outward from both ends of the first bent part in the radial direction and making surface contact with each of both inner peripheral surfaces of the incision groove of the diaphragm spring in the circumferential direction.

10. The double clutch assembly of claim 9, wherein the mounting part is formed at both ends of the body part, and includes a through hole for coupling with the auxiliary cover casing.

11. The double clutch assembly of claim 10, wherein the first protrusion is bent so as to protrude in the axial direction from a central portion of the body part, and a free end of the first protrusion extends horizontally to make surface contact with an outermost inner peripheral surface in the radial direction of the incision groove of the diaphragm spring.

12. The double clutch assembly of claim 9, wherein the position restriction structure is installed in a radial arrangement with respect to the center of the auxiliary cover casing, and the auxiliary cover casing includes a first through hole for coupling with the mounting part.

13. The double clutch assembly of claim 9, wherein the double clutch assembly further comprises an auxiliary position restriction structure fixed to the auxiliary pressure plate and to restrict the movement in the radial direction and the rotation direction of the auxiliary diaphragm spring, and the auxiliary position restriction structure includes one end inserted and supported in an assembly hole of the auxiliary pressure plate and the other end configured to make surface contact with an outermost inner peripheral surface in the radial direction and both inner peripheral surfaces in the circumferential direction of an incision groove of the auxiliary diaphragm spring.

14. The double clutch assembly of claim 13, wherein the auxiliary position restriction structure is installed in a radial arrangement with respect to the center of the auxiliary pressure plate, and the auxiliary cover casing includes a second through hole through which the auxiliary position restriction structure is inserted.

\* \* \* \* \*